US006047454A

United States Patent [19]
Huang

[11] Patent Number: 6,047,454
[45] Date of Patent: Apr. 11, 2000

[54] CLAMP FOR DISENGAGING AN INLET OR EXHAUST VALVE FROM AN ENGINE

[76] Inventor: Tsorng-Hann Huang, No. 47-2, Liu-Hsin Village, Shuishang Hsiang, Chia-Yi Hsien, Taiwan

[21] Appl. No.: 09/118,941

[22] Filed: Jul. 20, 1998

[51] Int. Cl.[7] ........................................ B23P 19/04
[52] U.S. Cl. ........................................ 29/220
[58] Field of Search ........................ 29/215, 217, 213.1, 29/220; 269/228

[56] References Cited

U.S. PATENT DOCUMENTS 4,654,944 4/1987 Graf ........................ 29/217
5,052,091 10/1991 Bryan et al. ........................ 29/215
5,373,642 12/1994 Supe-Dienes ........................ 269/228

*Primary Examiner*—Robert C. Watson
*Attorney, Agent, or Firm*—Bacon & Thomas, PLLC

[57] ABSTRACT

A clamp includes an arcuated frame with a stub connected to the first end thereof and a bracket connected to the second end thereof. The second end of the frame has a passage into which a rod is movably received which has one end thereof pivotally connected to a lever and the other end thereof connected to a tube so that when operating the lever, the rod together with the tube are moved toward the stub.

7 Claims, 7 Drawing Sheets

CLAMP FOR DISENGAGING AN INLET OR EXHAUST VALVE FROM AN ENGINE

FIELD OF THE INVENTION

The present invention relates to a clamp, and more particularly, to an improved clamp used to disengage the inlet or exhaust valve from an engine.

BACKGROUND OF THE INVENTION

A conventional clamp for disengaging the inlet or exhaust valve from an engine is shown in FIG. 4, and includes an arcuated frame 61 having a first end with a disk 62 connected thereto which has a slit 621 defined therethrough, and a second end having a lever 70 pivotally connected thereto. A plate 71 is pivotally connected to the lever 70 and the second end of the frame 61. Two links 72 have their two respective first ends pivotally connected to the plate 71 in parallel with each other. Two elongated rods 63 are pivotally connected to the frame 61 near the second end of the frame 61 and the two respective second ends of the two links 72 are pivotally connected to one of the two elongated boards 63. A U-shaped bracket 64 is connected to two distal ends of the elongated rods 63, and a rack 65 movably extends through the bracket 64. A stop 67 is pivotally connected to the bracket 64 so as to engage with the teeth 651 of the rack 65 and a driving member 69 is rotatably received in the bracket 64 and is driven by a knob 68 mounted outside of the bracket 64. The rack 65 has a ring member 66 attached to the end thereof facing to the disk 62.

Referring to FIGS. 5 and 6, a vehicle cylinder head 50 has a plurality of combustion chamber ends 51 (FIG. 6) and each of the combustion chamber ends 51 has two inlet valves 52 and two exhaust valves 53. Taking the exhaust valve 53 as an example to describe the conventional clamp, the exhaust valve 53 includes a stem 532 extending through the head casing and a spring 55 is mounted to the stem 532 that extends from the interior of the combustion chamber 51 with an end member 56 and a stop member 57 respectively mounted to the distal end of the stem 532. The spring 55 has one end thereof mounted to the end member 56 and the other end contacting the outer periphery of the cylinder head 50. The stop member 57 is used to hold the spring 55 on the stem 532. The other end of the stem 532 has a valve disk 531 which has an annular inclined surface to engage with a seat defining the opening in the engine casing.

When operating the clamp, the disk 62 is mounted over the stem 532 which is received in the slit 621, and the disk 62 is located between the end member 56 and the stop member 57. The valve disk 531 is pressed by the ring member 66 of the rack 65 by pushing the lever 70 downwardly to let the links 72 push the two elongated rods 63 together with the bracket 64 toward the cylinder head 50. The knob 68 is then rotated to drive the driving member 69 to move the rack 65 toward the valve disk 531 till the spring 55 is compressed and the end member 56 is moved away from the stop member 57. The stop 67 has the function as a ratchet pawl so that when the rack 65 is moved toward the valve disk 531, the stop 67 will not impede the movement of the rack 65 and prevents the rack 65 from moving back. The stop member 57 then can be removed from the stem 532 by a proper tool so that the stem 532 can be pulled from the cylinder head 50.

The conventional clamp is deemed to include too many parts. Furthermore, it is difficult to compress the spring 55 simply by rotating the knob 68, especially when the operator's hands are covered with grease or oil. The torque output from the driving member 69 is limited because its size is small.

The present invention intends to provide a clamp for disengaging the inlet or exhaust valve from the engine, wherein the clamp has a simple structure and is easily to operate so that the disadvantage of the conventional clamp mentioned above can be obviated.

SUMMARY OF THE INVENTION

In accordance with one aspect of the present invention, a clamp is provided and comprises an arcuated frame having a first end with a stub and a second end connected to a bracket, said second end of said frame having a passage defined therethrough so as to movably receive a valve stem therein. A lever has two positions thereof respectively and pivotally connected to said bracket and the first end of said rod. A tube is adjustably connected to a second end of said rod and has a plurality of openings defined through the periphery thereof.

An object of the present invention is to provide a clamp having a simple structure.

Another object of the present invention is to provide a clamp which is easily to operate.

Yet another embodiment of the present invention is to provide a clamp wherein a large force is not required.

Further objects, advantages, and features of the present invention will become apparent from the following detailed description with appropriate reference to the accompanying drawings.

DETAILED DESCRIPTION OF THE PREFERRED EMBODIMENT

Figure 1:
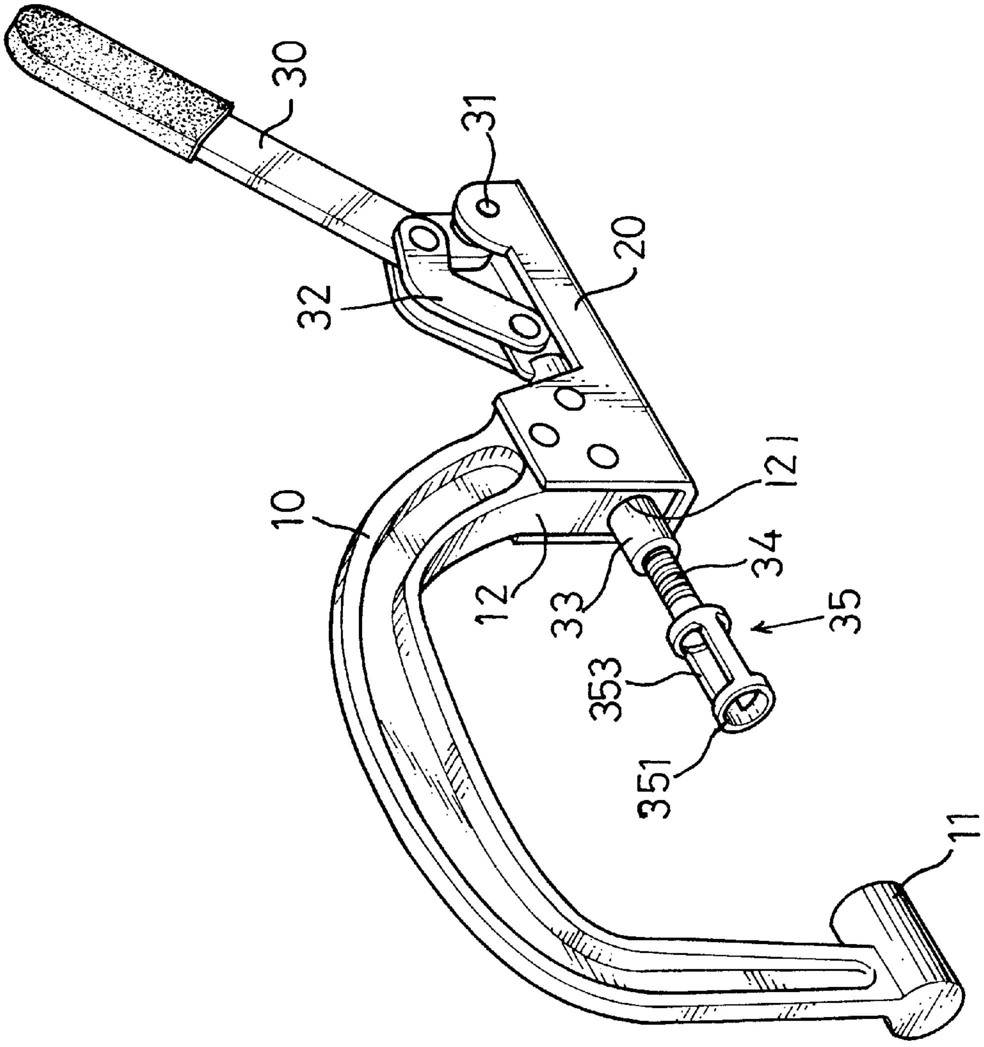
FIG. 1 is a perspective view of the clamp in accordance with the present invention.
Figure 2:
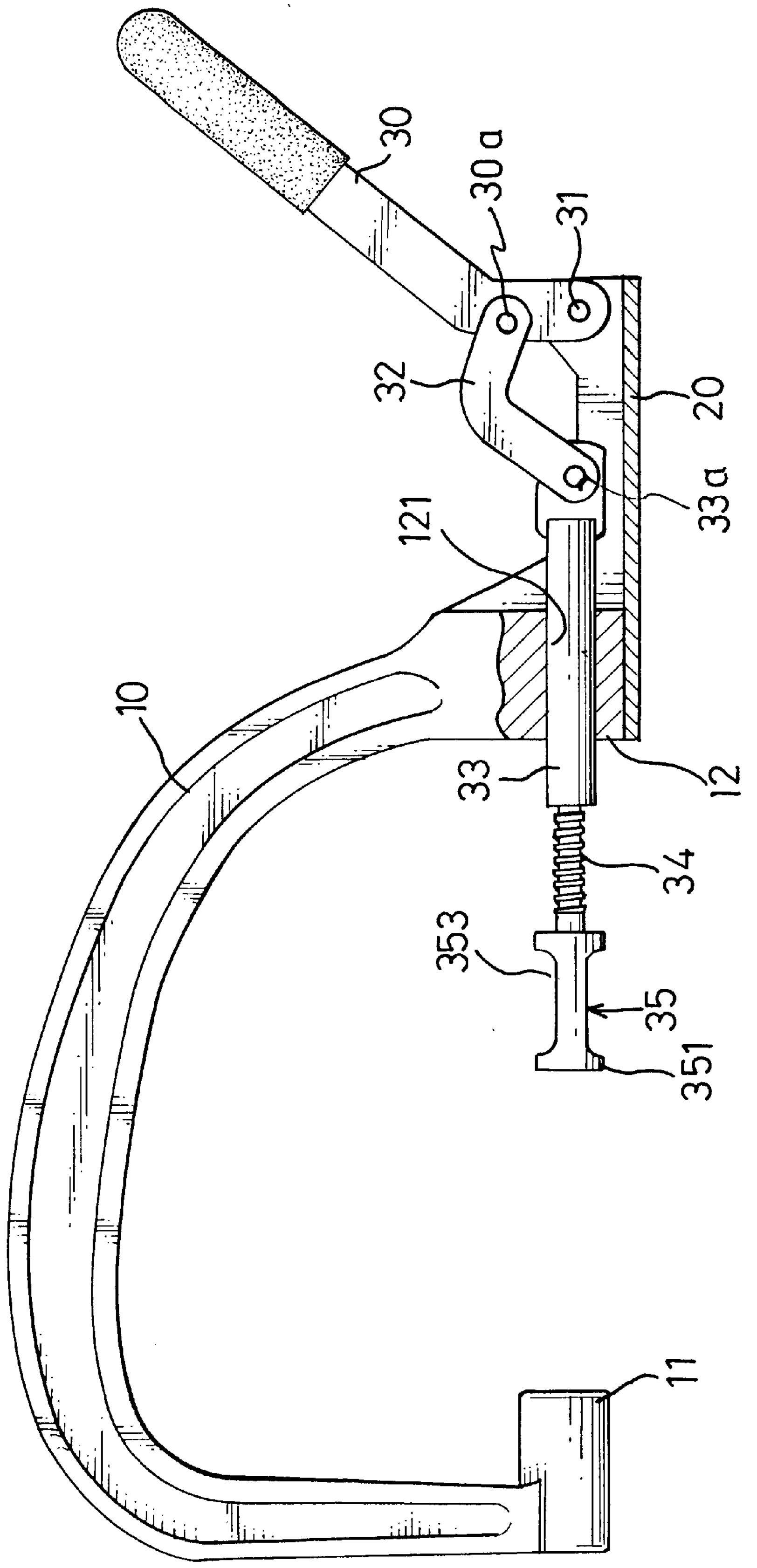
FIG. 2 is a side elevational view, partly in section, of the clamp in accordance with the present invention.

Referring to FIGS. 1 and 2, a clamp in accordance with the present invention comprises an arcuated frame 10 having a first end with a stub 11 extending horizontally and a second end connected to a U-shaped bracket 20. The second end of the frame 10 has a passage or have 121 defined therethrough extending toward stub 11 and a rod 33 is movably received in said passage 121. A lever 30 has a first position thereof supported by and pivotally connected to said bracket 20 by a transverse pin 31 and a second position thereof connected at pin 30*a* to two connecting members 32 which are pivotally connected to the first end of said rod 33 at pin 33*d*. The two connecting members 32 each are arcuated so that when pushing the lever 30 toward the frame 10, the rod 33 is moved toward the stub 11.

Figure 3:
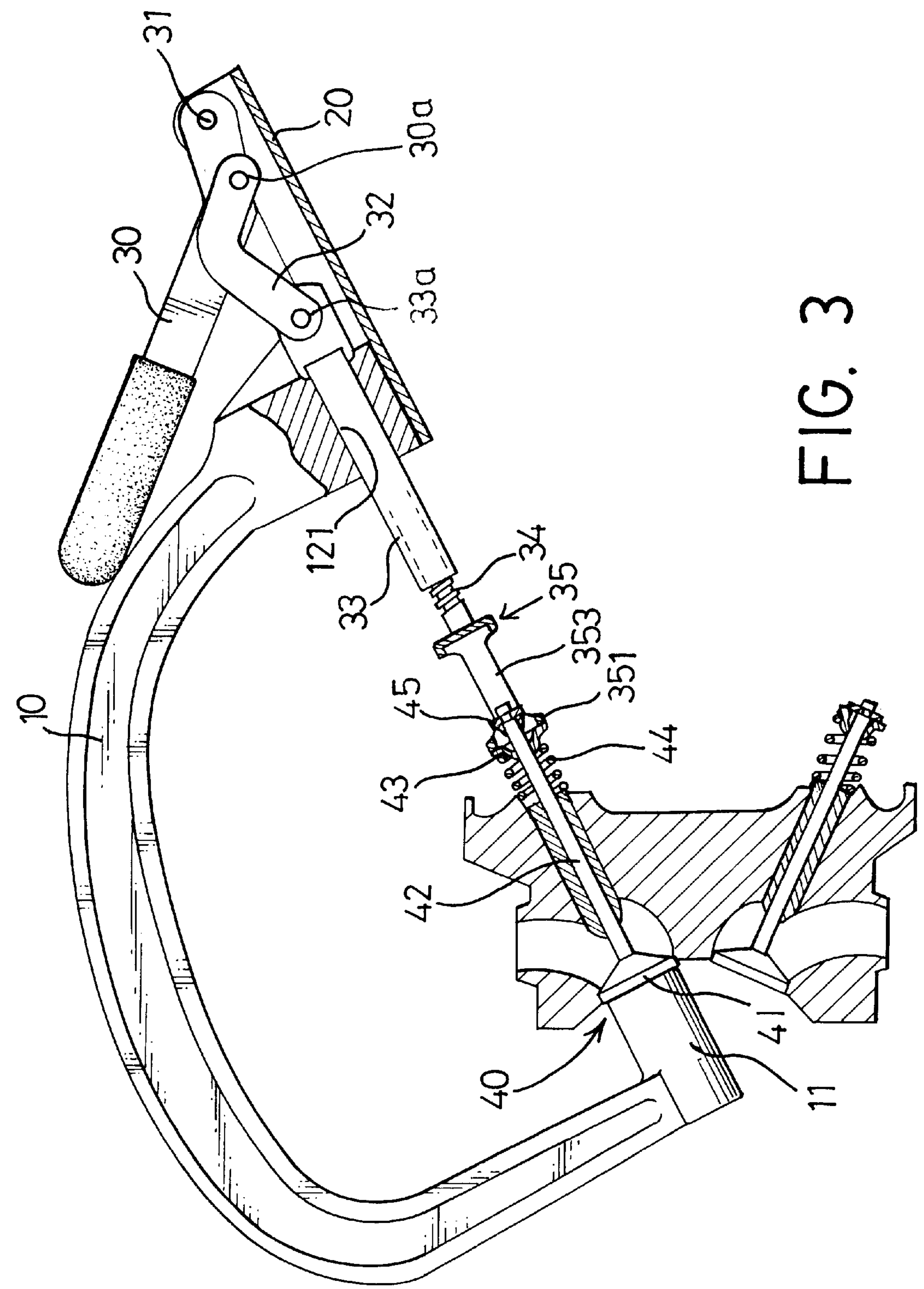
FIG. 3 is an illustrative view to illustrate when the clamp is used to disengage the inlet valve of an engine.
Figure 4:
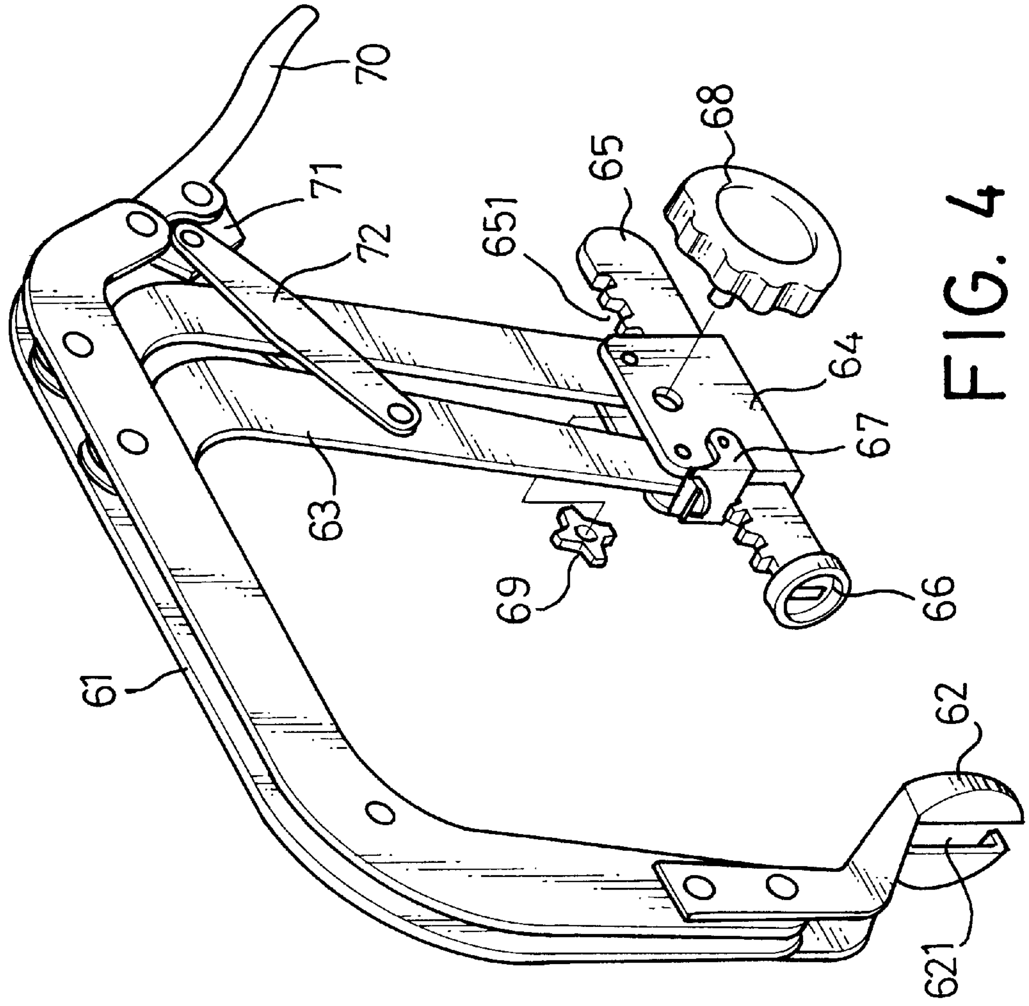
FIG. 4 PRIOR ART
FIG. 4 is a perspective view of the conventional clamp with the driving member and the knob being exploded from the clamp.
Figure 5:
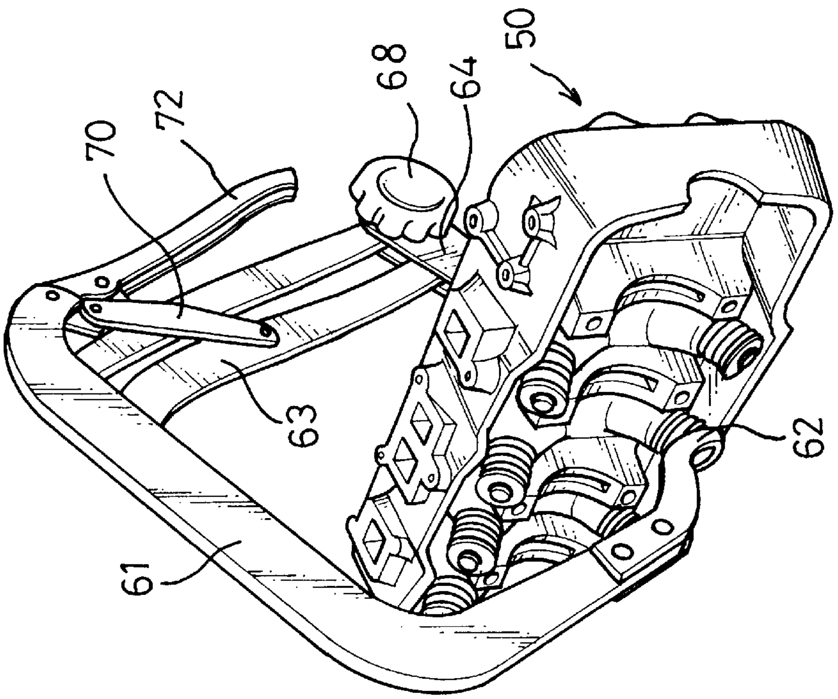
FIG. 5 PRIOR ART
FIG. 5 is a perspective view to show the conventional clamp is used to clamp the valve.
Figure 6:
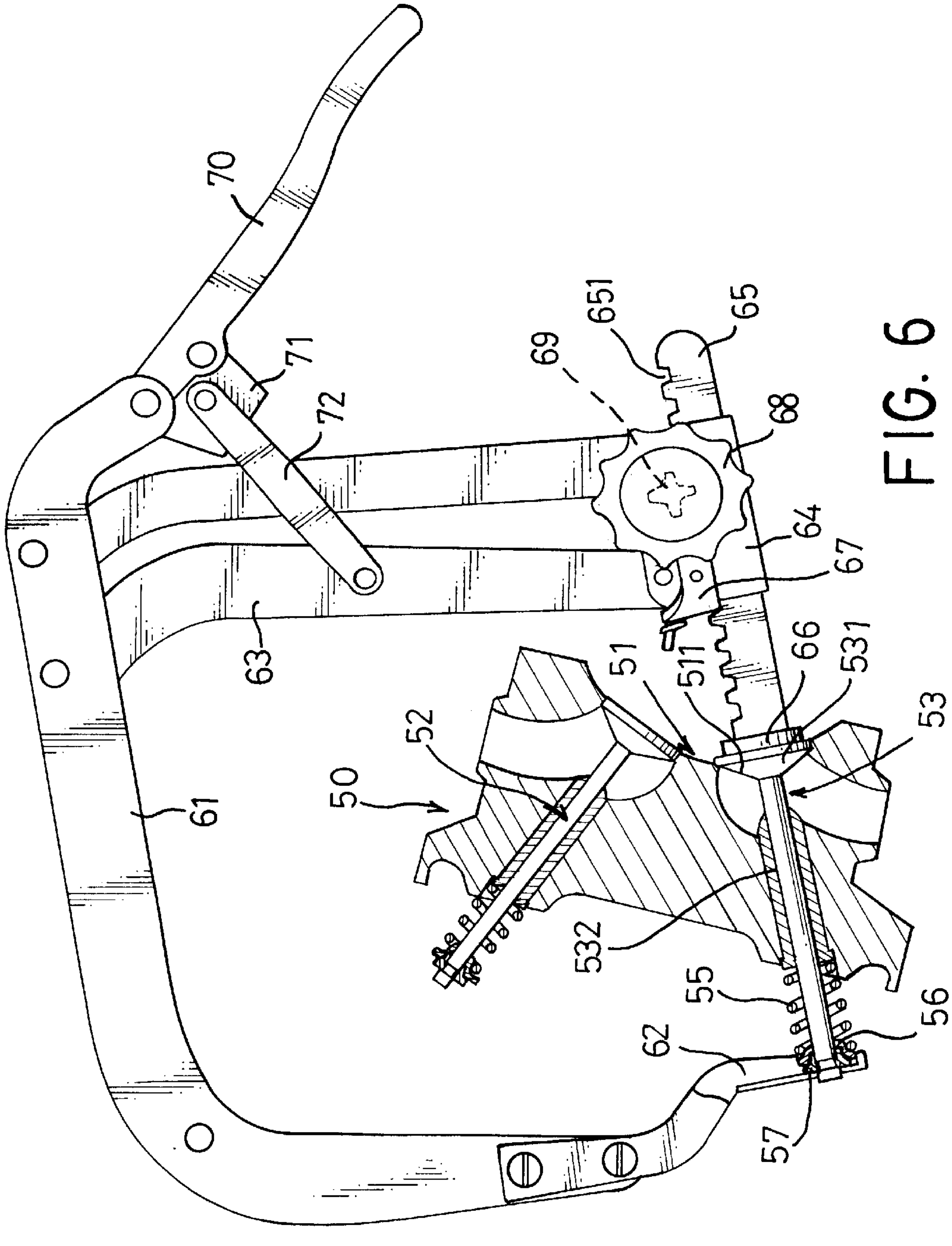
FIG. 6 PRIOR ART
FIG. 6 is a side elevational view, partly in section, of the conventional clamp clamping the exhaust valve of the engine.
Figure 7:
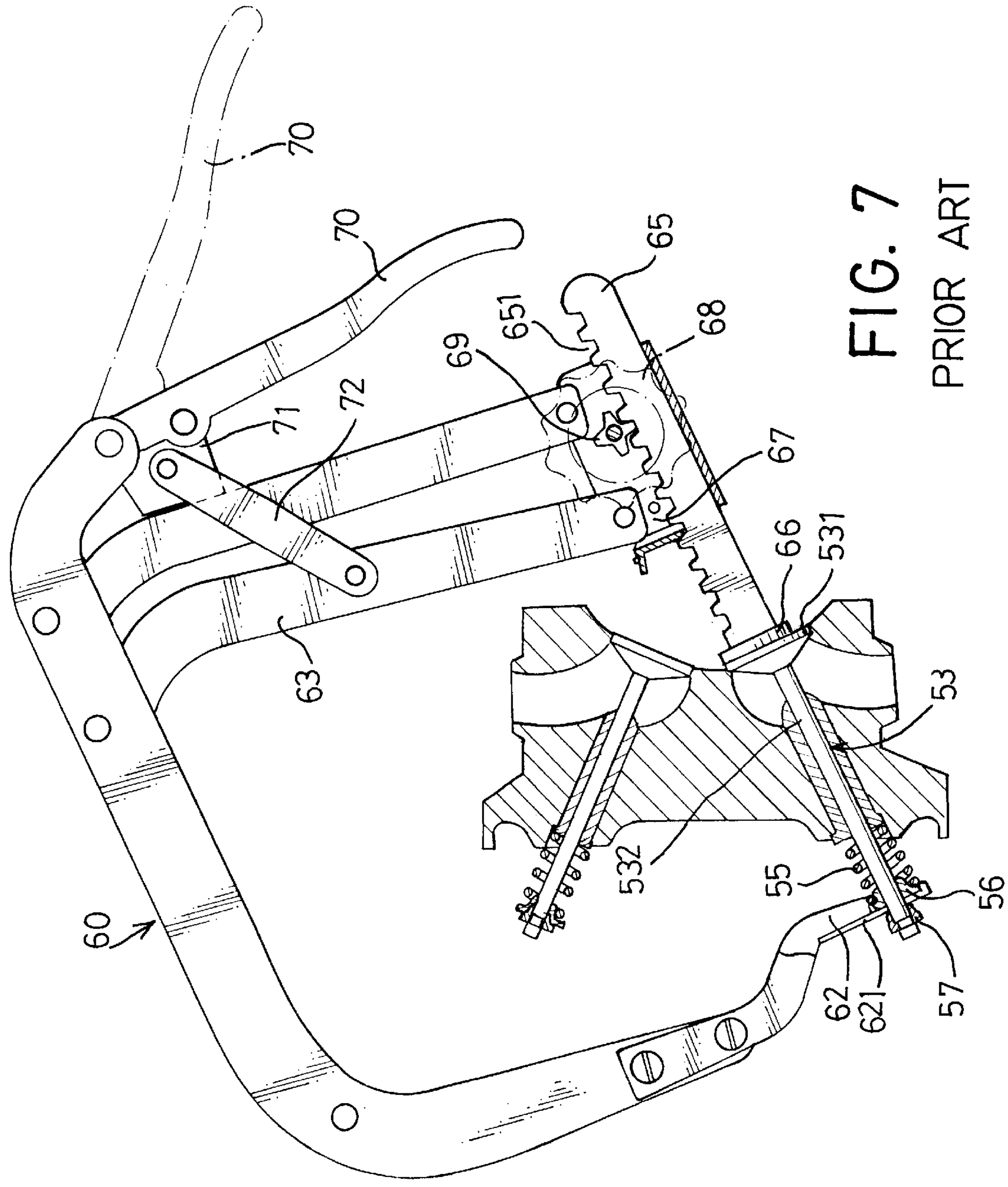
FIG. 7 PRIOR ART
FIG. 7 is a side elevational view, partly in section, of the conventional clamp which is operated by pushing the lever downwardly.

When the lever 30 is rotated as shown in FIG. 3, the pins 31, 30*a* and 33*a* are substantially in alignment and rod 33 is fully extended toward stub 11.

A threaded stem 34 threadedly extends from the second end of said rod 33 and a pusher tube 35 is connected to said threaded stem 34. The tube 35 has a plurality of openings 353 defined through the periphery thereof and a ring member 351 formed at the distal end thereof.

Referring to FIG. 3, when the clamp of the present invention is used to disengage the inlet valve 40 of the engine, the valve disk 41 of the inlet valve 40 contacts the stub 11 and the stop member 45 of the inlet valve 40 is received in the ring member 351 of the tube 35 and the end member 43 of the inlet valve 40 contacts the distal edge of the ring member 351. The position of tube 35 is adjusted by rotating the tube to advance or withdraw threaded rod 34 relative to rod 33. The lever 30 is then pulled toward the frame IO such that the rod 33 is moved toward the stub 11 and the spring 44 is compressed. The stop member 45 is therefore accessed via the openings 353 and disengaged from the stem 42 of the inlet valve 40 by a proper tool. The threaded rod 34 allows the operator to adjust the distance between the tube 35 and the stub 11 so as to fit the engines with different size valves.

The operation process of the clamp of the present invention is simplified because once the stop member 45 is received in the tube 35, the operator simply pulls the lever 30 toward the frame 10. Furthermore, the force exerted by the lever 30 is sufficient to compress the spring 44 so that the operator will conveniently and quickly complete the job.

The invention is not limited to the above embodiment but various modifications thereof may be made. It will be understood by those skilled in the art that various changes in form and detail may made without departing from the scope and spirit of the present invention.

What is claimed is:

1. A valve spring compressing clamp comprising:

an arcuated frame (10) having a first end with a stub (11) and a second end connected to a bracket (20), a passage 121 defined through said second end of said frame (10) and a rod (33) movably received in said passage (121);

a lever (30) having two positions thereof respectively and pivotally connected to said bracket (20) at a first end of said rod (33); and a hollow tube (35) adjustably connected to a second end of said rod (33) and having a plurality of openings (353) defined through the periphery thereof.

2. The clamp as claimed in claim 1 further comprising a threaded stem (34) threadedly extending from said second end of said rod (33) and said tube (35) connected to said threaded stem (34).

3. The clamp as claimed in claim 1, wherein said hollow tube (35) has a ring member (351) formed at a distal end thereof.

4. The clamp as claimed in claim 1 further comprising a connecting member (32) connected between said tube (35) and said lever (30).

5. A valve spring compressing clamp comprising:

an arcuate generally U-shaped frame having a first end including a stub adapted to engage an internal combustion engine valve head;

a second end including a bore extending therethrough in a direction extending toward said stub; and a lever holding portion extending away from said stub;

a push rod in said bore, said rod including a threaded opening in a first end facing toward said stub;

a threaded adjusting stem adjustably and rotatably threadedly received in said threaded opening;

a pusher tube secured to an end of said rod and extending coaxially with said rod;

said pusher tube including an axial opening in an end thereof facing toward said stub and multiple transverse openings in a side wall area thereof, said axial opening configured to engage a valve spring while permitting passing of a valve stop member;

an actuating lever device connected to a second end of said pusher rod, said actuating lever comprising a lever pivotally connected to said lever holding portion at a pivotal connection, an intermediate link pivotally connected at its opposed ends respectively to an end of said rod extending away from said stub and to said lever at a distance from said pivotal connection, said intermediate link pivotally connected to said rod and lever so that upon rotation of said lever towards the stub end about said pivotal connection, the pivotal connection and said pivotal connections between the intermediate link, the push rod and the lever may be substantially aligned.

6. The valve spring compressing clamp as claimed in claim 5, wherein said lever holding portion comprises a U-shaped bracket rigidly connected at one end to said second end of said frame and wherein said pivoted connection between said lever and said holding portion is located at an end of said U-shaped bracket extending away from said frame.

7. A valve spring compressing clamp as recited in claim 6, wherein said pivoted connection between said lever and said lever holding portion extends transversely across said bracket.

* * * * *